(12) United States Patent
Zerbino

(10) Patent No.: US 12,520,740 B2
(45) Date of Patent: Jan. 13, 2026

(54) SYSTEM AND METHOD FOR CONTROLLING OPERATION OF A WORK VEHICLE

(71) Applicant: KUBOTA CORPORATION, Osaka (JP)

(72) Inventor: Fulvio Zerbino, Crepy-en-Valois (FR)

( * ) Notice: Subject to any disclaimer, the term of this patent is extended or adjusted under 35 U.S.C. 154(b) by 225 days.

(21) Appl. No.: 17/569,535

(22) Filed: Jan. 6, 2022

(65) Prior Publication Data
US 2022/0232751 A1 Jul. 28, 2022

(30) Foreign Application Priority Data

Jan. 25, 2021 (EP) .................................... 21305090

(51) Int. Cl.
| | |
|---|---|
| *A01B 71/02* | (2006.01) |
| *A01B 59/04* | (2006.01) |
| *A01B 63/111* | (2006.01) |
| *A01B 63/112* | (2006.01) |

(52) U.S. Cl.
CPC .............. *A01B 71/02* (2013.01); *A01B 59/04* (2013.01); *A01B 63/1117* (2013.01); *A01B 63/112* (2013.01)

(58) Field of Classification Search
CPC ..... A01B 71/02; A01B 59/04; A01B 63/1117; A01B 63/112
See application file for complete search history.

(56) References Cited

U.S. PATENT DOCUMENTS

| | | | |
|---|---|---|---|
| 9,008,920 B1* | 4/2015 | Smith | ..................... A01F 15/08 56/10.2 G |
| 2008/0224445 A1* | 9/2008 | Viaud | ................. A01F 15/0883 280/442 |
| 2009/0107102 A1* | 4/2009 | Biziorek | ............. A01F 15/0883 56/341 |
| 2011/0112729 A1 | 5/2011 | Martin | |

(Continued)

FOREIGN PATENT DOCUMENTS

| | | | | |
|---|---|---|---|---|
| EP | 2745674 A1 * | 6/2014 | ......... A01F 15/0833 |
| JP | 2003061454 A | 3/2003 | |

(Continued)

OTHER PUBLICATIONS

Machine translation of JP2003061454A.
Machine translation of JP2004159574.

*Primary Examiner* — Navid Z. Mehdizadeh
*Assistant Examiner* — Oliver Tan
(74) *Attorney, Agent, or Firm* — Cabinet Beau de Lomenie

(57) ABSTRACT

A system comprising a work machine ECU configured to communicate with a vehicle, a vehicle ECU configured to communicate with a work machine, the vehicle ECU configured to control operation of the vehicle at in a first mode, the first mode being determined by a first signal transmitted from the work machine ECU to the vehicle ECU, the vehicle ECU configured to operate the vehicle in a second mode, the second mode being determined by a second signal transmitted from the work machine ECU to the vehicle ECU, and an actuator configured to send a command to the vehicle ECU to operate the vehicle in a third mode, the third mode being determined by a third signal transmitted from the work machine ECU to the vehicle ECU.

19 Claims, 2 Drawing Sheets

(56) References Cited

U.S. PATENT DOCUMENTS

| | | | |
|---|---|---|---|
| 2011/0238269 A1* | 9/2011 | Martin | A01F 15/08 |
| | | | 701/50 |
| 2013/0186657 A1* | 7/2013 | Kormann | A01B 69/004 |
| | | | 172/278 |
| 2014/0058637 A1* | 2/2014 | Martin | A01B 69/008 |
| | | | 701/50 |
| 2019/0351905 A1* | 11/2019 | Maus | B60W 30/143 |
| 2020/0100640 A1* | 4/2020 | Marutani | A47L 11/4061 |
| 2021/0022296 A1 | 1/2021 | Miwa | |
| 2022/0242386 A1* | 8/2022 | Yorke | B60W 30/18018 |

FOREIGN PATENT DOCUMENTS

| | | |
|---|---|---|
| JP | 2004159574 A | 6/2004 |
| JP | 2019176760 A | 10/2019 |

* cited by examiner

SYSTEM AND METHOD FOR CONTROLLING OPERATION OF A WORK VEHICLE

FIELD

The present disclosure relates generally to the field of work vehicles. More specifically, the present disclosure relates to a system for controlling operation of a work vehicle in combination with a work machine.

BACKGROUND

A work vehicle, such as a tractor, is typically operated in combination with one or more work machine, such as an agricultural implement, in order to carry out and/or perform farm work. Accordingly, the work vehicle may be retrofitted and/or customized with the work machine in order to carry out and/or perform an intended form of farm work, such as soil cultivation, planting, fertilizing, irrigation, harvesting, and/or hay making.

In such a combination between a work vehicle and a work machine, it is common that work vehicles and work machines of different manufacturers are frequently combined with each other. As such, it has been promulgated and established that connection and compatibility between work vehicles and work machines of different manufacturers is possible. As such, international standard ISO 11783 (ISOBUS), based on a control area network (CAN), has been developed as a communication protocol for the agriculture industry. Particularly, ISO 11783 defines a communication protocol for exchanging, between a work vehicle and a work machine, information concerning operation of the work vehicle and/or the work machine.

Many modern work vehicles and work machines also typically include a tractor implement management (TIM) system. The TIM system is an ISOBUS-based solution for a cross-manufacturer agricultural technology system, which may enable a work machine to control certain operation and/or functions of the work vehicle and vice versa. More specifically, the TIM system allows for interactive communication between the work vehicle and the work machine, such that a control signal from the work machine may be received by the work vehicle in order for the work machine to carry out, for example, automatic speed control of the work vehicle.

However, in a work vehicle and work machine combination in which the work machine automatically controls the speed of the work vehicle, a user of the work vehicle and work machine combination may lose ability to manually control the speed of the work vehicle. A lack of manual control of the speed of the work vehicle by the user may deprive the user of appropriate oversight in carrying out farm work and/or cause an unsafe condition.

It is desirable to provide an improved system for controlling operation of a work vehicle which includes an intermediary and/or a safeguard between a work machine and control of the operation of the work vehicle by the work machine.

SUMMARY

According to aspects of the present disclosure, a system for controlling operation of a vehicle is provided, the vehicle being configured to operate in combination with a work machine and the work machine being configured to perform a work function, the system comprising a work machine electronic control unit being configured to communicate with the vehicle and to control performance of a work function of the work machine, a vehicle electronic control unit being configured to communicate with the work machine and to control operation of the vehicle, the vehicle electronic control unit being configured to control operation of the vehicle in a first mode, the first mode being determined by a first signal transmitted from the work machine electronic control unit to the vehicle electronic control unit, the vehicle electronic control unit being configured to operate the vehicle in a second mode, the second mode being determined by a second signal transmitted from the work machine electronic control unit to the vehicle electronic control unit, and an actuator being configured to send a command to the vehicle electronic control unit to operate the vehicle in a third mode, the third mode being determined by a third signal transmitted from the work machine electronic control unit to the vehicle electronic control unit.

According to aspects of the present disclosure, the first signal, second signal, and third signal are sent from the work machine electronic control unit to the vehicle electronic control unit based upon a determination made by the work machine corresponding to performance of a work function by the work machine.

According to aspects of the present disclosure, the determination made by the work machine is made by a sensor included by the work machine.

According to aspects of the present disclosure, the determination made by the sensor is sent to the work machine electronic control unit.

According to aspects of the present disclosure, completion of performance of a work function by the work machine prompts the work machine electronic control unit to transmit the third signal to the vehicle electronic control unit.

According to aspects of the present disclosure, the second mode includes the vehicle moving at a speed within a range of speeds between 0.00 km/h and 0.50 km/h.

According to aspects of the present disclosure, a speed of operation of the vehicle in the first mode is greater than a speed of operation of the vehicle in the second mode.

According to aspects of the present disclosure, a speed of operation of the vehicle in the third mode is greater than a speed of operation of the vehicle in the second mode.

According to aspects of the present disclosure, a method for controlling a vehicle is provided, the vehicle being configured to operate in combination with a work machine and the work machine being configured to perform a work function, the method comprising communicating a first signal from the work machine to the vehicle, operating the vehicle in a first mode, the first mode being determined by the first signal transmitted from the work machine to the vehicle, communicating a second signal from the work machine to the vehicle, operating the vehicle in a second mode, the second mode being determined by the second signal transmitted from the work machine to the vehicle, communicating a third signal from the work machine to the vehicle, and executing a command to operate the vehicle in a third mode, the third mode being determined by the third signal transmitted from the work machine to the vehicle.

According to aspects of the present disclosure, communicating the third signal includes prompting a request to operate the vehicle in the third mode to be sent to the vehicle.

According to aspects of the present disclosure, communicating the third signal includes the work machine making a determination corresponding to completion of performance of a work function by the work machine.

According to aspects of the present disclosure, operating the vehicle in the first mode includes operating the vehicle at a speed greater than a speed of operation of the vehicle of the second mode.

According to aspects of the present disclosure, operating the vehicle in the third mode includes operating the vehicle at a speed greater than a speed of operation of the vehicle in the second mode.

In the manner described and according to aspects illustrated herein, the system for controlling a vehicle and the method for controlling a vehicle are contemplated to provide an intermediary and/or a safeguard to improve the ability of a user to control operation of a vehicle in which a work machine is configured to determine modes of operation of the vehicle. Consequently, the system and the method provide for improved safety in the operation of a vehicle and work machine combination.

BRIEF DESCRIPTION OF THE DRAWINGS

Aspects of an embodiment will be described in reference to the drawings, where like numerals reflect like elements.

DETAILED DESCRIPTION

Figure 1:
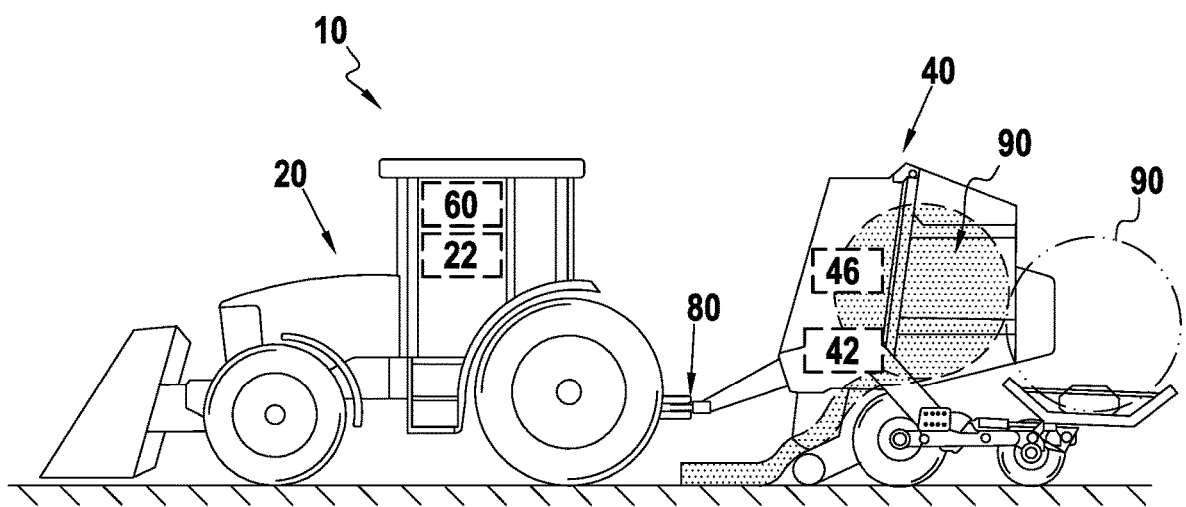
FIG. 1 is a side view of a system for controlling a vehicle, in use in a work vehicle and a work machine.

An embodiment of a system for controlling operation of a vehicle according to aspects of the disclosure will now be described with reference to FIGS. 1-2, wherein like numerals represent like and/or functionally similar parts. The system will generally be referred to by the reference numeral 10. Although the system 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described zo in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Additionally, the language used herein has been principally selected for readability and instructional purposes, and may not have been selected to delineate or circumscribe inventive subject-matter. Accordingly, the disclosure of the present disclosure is intended to be illustrative, but not limiting, of the scope of the disclosure, which is set forth in the claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present inventive subject matter.

Unless specifically stated otherwise as apparent from the following discussion, it is appreciated that throughout the description, discussions utilizing terms such as "processing," "computing," "calculating," "determining," "displaying," "estimating," "determining," or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein. It should be noted that the process steps and instructions of the present disclosure may be embodied in software, firmware, and/or hardware, and when embodied in software, could be downloaded to reside on and be operated from different platforms used by a variety of operating systems.

The present disclosure also relates to control devices (each being referred to herein as an "electronic control unit") for performing the operations of the system 10 discussed herein. The control devices may be specially constructed for the required purposes, or the control devices may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memory (ROM), random access memory (RAM), erasable programmable read-only memory (EPROM), electrically erasable programmable read-only memory (EEPROM), magnetic or optical cards, reduced instruction set computer (RISC), application specific integrated circuit (ASIC), or any type of media suitable for storing electronic instructions, and each coupled to a computer system bus. Furthermore, the computers referred to herein may include a single processor or architectures employing multiple processor designs for increased computing capability.

The computers presented herein are not inherently related to any particular computer or other apparatus. Various general-purpose systems may also be used with programs in accordance with aspects presented herein, or it may prove convenient to construct a more specialized apparatus to perform required method steps. The required structure for a variety of these systems will appear from the aspects disclosed herein. In addition, the present disclosure is not described with reference to any particular programming language. It will be appreciated that a variety of programming languages may be used to implement the teachings of the present disclosure as described herein, and any references below to specific languages are provided for disclosure of enablement and best mode of the present disclosure.

Figure 2:
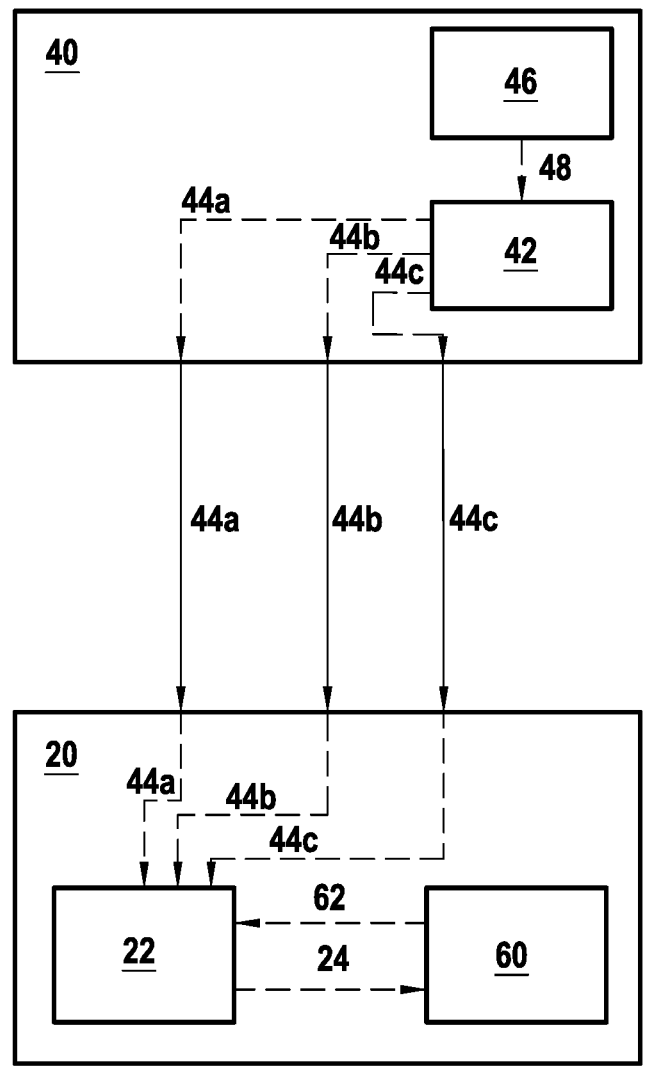
FIG. 2 is a schematic representation of the system for controlling a vehicle.

As shown in FIGS. 1-2, a system 10 for controlling operation of a vehicle (hereafter, "the system") is disclosed. It is contemplated that the system 10 may be described and/or implemented as a method. Referring to FIG. 1, the system 10 includes a vehicle 20, one or more implement (also referred to herein as a "work machine") 40, and one or more actuator 60. To control operation of a vehicle 20, the system 10 may be configured to be incorporated into software and/or hardware which may be included by the vehicle 20, the implement 40, and/or the actuator 60.

In the disclosed embodiment, the vehicle 20 is an agricultural vehicle and/or work vehicle. Particularly, in the disclosed embodiment, the vehicle 20 is a tractor configured to carry out farm work. Additionally, the vehicle 20 is configured for use in combination with the implement 40. Additionally or alternatively, it is contemplated that the vehicle 20 may be configured for use with a plurality of implements 40. However, the plurality of implements 40 will be referred to herein as "the implement 40," unless specific reference to a plurality of implements 40 is otherwise necessary. In the disclosed embodiment, the implement 40 is an agricultural machine and/or work machine. Particularly, in the disclosed embodiment, the implement 40 is configured to perform a work function and/or the farm work. As such, the implement 40 may be a baler, a plow, a tiller, a seeder, a sprayer, a swather, and/or the like.

As shown in FIG. 1, there is a physical connection 80 between the vehicle 20 and the implement 40. Additionally, the vehicle 20 and the implement 40 are configured to communicate. As such, the vehicle 20 and the implement 40 may be communicatively connected by, for example, the international standard ISO 11783, which is called ISOBUS and based on a control area network (CAN). Additionally, the vehicle 20 and the implement 40 may each include a tractor implement management (TIM) system. It is contemplated that a TIM system as referred to herein may be understood to be an ISOBUS-based agricultural technology system enabling compatibility and interactive communication between the vehicle 20 and the implement 40, which may each be products that are different in manufacturer. In the disclosed embodiment, certain operations of the vehicle 20 may be determined by the implement 40. Additionally or alternatively, certain operations of the implement 40 may be determined by the vehicle 20. As such, the TIM system is configured to facilitate bidirectional communication. In view of the TIM system, the vehicle 20 may be understood as and/or referred to herein as a "resource provider" and the implement 40 may be understood as and/or referred to herein as a "resource manager." Additionally, the vehicle 20 may be understood as an owner of TIM functions, and thereby referred to herein as a "TIM server." Additionally, the implement 40 may be understood as a generator of TIM commands, and thereby referred to herein as a "TIM client." In the disclosed embodiment, the actuator 60 is configured to function as an intermediary and/or safeguard between the bidirectional communication of the vehicle 20 and the implement 40. In this manner, the system 10 allows for improved safety in the completion of farm work with a TIM system.

As shown in FIG. 2, the implement 40 is configured to function in combination with the vehicle 20. To this end, the implement 40 is configured to communicate with the vehicle 20. In the disclosed embodiment, the implement 40 includes one or more implement electronic control unit (ECU) (also understood as and/or referred to herein as the "implement electronic control system" or the "first electronic control unit") 42. The implement ECU 42 is configured to communicate with the vehicle 20. Particularly, the implement ECU 42 is configured to communicate with a vehicle electronic control unit 22 included by the vehicle 20 (discussed further below). In this manner, the implement ECU 42 is configured to transmit signals 44a, 44b, 44c to the vehicle 20. It is contemplated that the implement ECU 42 transmits the signals 44a, 44b, 44c to the vehicle 20 via a wired connection, a wireless connection, or any other manner of transmitting information which may be compatible with the system 10. The implement ECU 42 is also configured to control performance of one or more work function performed by the implement 40. It is contemplated that the term "work function" as used herein may be understood as a farm work activity, such as baling, plowing, tilling, spraying, swathing, and the like.

Referring to FIGS. 1-2, the implement 40 includes one or more sensor 46 configured to communicate with the implement ECU 42. In the disclosed embodiment, the sensor 46 is configured to determine a status 48 of the implement 40 with respect to completion of the work function by the implement 40 (also referred to herein as "implement status information 48" and/or "work machine status information 48"). The sensor 46 is configured to provide the implement status information 48 to the implement ECU 42. The implement ECU 42 is configured to transmit a signal 44a, 44b, 44c to the vehicle 20 corresponding to the implement status information 48. In this manner, certain operations of the vehicle 20 are determined by the implement 40.

Additionally or alternatively, it is contemplated that transmission of the signal 44a, 44b, 44c may be prompted by an internal timer (not shown) included by the vehicle 20 and/or the implement 40. Additionally or alternatively, it is contemplated that the signal 44a, 44b, 44c may be prompted based upon a measurement related to a specific feature and/or function of the vehicle 20 (e.g. speed of the vehicle 20, oil pressure of the vehicle 20, hitch position of the vehicle 20, power take-off (PTO) rpm of the vehicle 20, and/or the like), which is communicated by the vehicle 20 to the implement 40. In the TIM system, it is contemplated that the aforementioned measurements related to features and/or functions of the vehicle 20 may be continuously communicated by the vehicle 20 to the implement 40.

Additionally or alternatively, it is contemplated that the aforementioned measurements related to features and/or functions of the vehicle 20 may be communicated by the vehicle 20 to the implement 40 independent of the features and/or functions of the vehicle 20. Additionally, the measurements related to features and/or functions of the vehicle 20 may be continuously read by the implement 40. Reading of the measurements by the implement 40 may prompt the implement 40 to transmit the signal 44a, 44b, 44c. In this manner, certain operations of the vehicle 20 may be determined by a measurement related to a feature and/or function of the vehicle 20.

As shown in FIG. 2, the vehicle 20 is also configured to operate in combination with the implement 40. To this end, the vehicle 20 is configured to communicate with the implement 40. In the disclosed embodiment, the vehicle 20 includes one or more vehicle electronic control unit (ECU) (also understood as and/or referred to herein as the "vehicle electronic control system" and/or the "second electronic control unit") 22. The vehicle ECU 22 is configured to communicate with the implement 40. Particularly, the vehicle ECU 22 is configured to communicate with the implement ECU 42. Additionally, the implement ECU 42 is configured to communicate with the vehicle ECU 22. The vehicle ECU 22 is also configured to control operation of the vehicle 20. In the disclosed embodiment, the vehicle ECU 22 is configured to control a mode of operation of the vehicle 20. Additionally or alternatively, it is contemplated that the mode of operation of the vehicle 20 may include control of a speed of the vehicle 20 upon and/or along a surface. Further, the mode of operation of the vehicle 20 may be dependent upon the implement status information 48 acquired by the sensor 46. In the disclosed embodiment, the vehicle 20 may have a first mode of operation, which may include the vehicle 20 moving at a normal operating speed; a second mode of operation, which may include operating the vehicle 20 at a standstill; and a third mode of operation, which may include the vehicle 20 returning to and/or moving at a normal operating speed. It is contemplated that the term "normal operating speed" may be understood as any speed greater than a standstill and/or greater than a speed of operation of the vehicle 20 in the second mode of operation. Additionally, it is contemplated that the term "standstill" may be understood as a condition in which movement of the vehicle 20 is stopped and/or substantially stopped. Additionally or alternatively, it is contemplated that a "standstill" may be understood as any speed in which a bystander is unable to clearly detect motion of the vehicle 20 and/or the implement 40. It should be understood that although three modes of operation of the vehicle 20 are disclosed herein to describe the system 10, the system 10 may include operation of the vehicle 20 in more than three modes or less than three modes.

As shown in FIG. 2, the implement ECU 42 may be configured to transmit a first signal 44a, a second signal 44b, and a third signal 44c to the vehicle ECU 22. The first signal 44a, second signal 44b, and third signal 44c may each dependent upon and/or correlate to the implement status information 48 acquired by the sensor 46. Additionally or alternatively, the first signal, 44a, the second signal 44b, and the third signal 44c may be dependent upon and/or correlate to a measurement related to a feature and/or function of the vehicle 20, which may be communicated from the vehicle 20 and/or the vehicle ECU 22 to the implement 40. However, dependence and/or correlation of the first signal, 44a, the second signal 44b, and the third signal 44c to the measurement related to the feature and/or function of the vehicle 20 will be discussed herein with reference to the implement status information 48 acquired by the sensor 46, unless discussion of the measurement related to the feature and/or function of the vehicle is otherwise necessary. Additionally, the first signal, 44a, the second signal 44b, and the third signal 44c are configured to correspond to the first mode of operation of the vehicle 20, the second mode of operation of the vehicle 20, and the third mode of operation of the vehicle 20, respectively. It should be understood that although the first signal 44a, the second signal 44b, and the third signal 44c are disclosed herein, the system 10 may include the use of more than three signals 44a, 44b, 44c, and/or less than three signals 44a, 44b, 44c.

In correspondence with the first signal 44a transmitted to the vehicle ECU 22 by the implement ECU 42, the vehicle ECU 22 is configured to control operation of the vehicle 20 at in the first mode. The first signal 44a is dependent upon a first determination of the implement status information 48 by the sensor 46. In the disclosed embodiment, the first mode includes operating the vehicle 20 at a normal operating speed. As such, operation of the vehicle 20 in the first mode includes operation of the vehicle 20 at a speed that is greater than a speed of operation of the vehicle 20 in the second mode. More specifically, the first mode may include operation of the vehicle 20 at a speed within a range of speeds between a selected upper limit speed of the second mode of operation of the vehicle 20 and 20.00 km/h. Additionally or alternatively, the first mode may include operation of the vehicle 20 at a speed within a range of speeds between 0.11 km/h and 20.00 km/h, but may preferably include operation of the vehicle 20 at a speed of approximately 5.00 km/h. It is contemplated that the speed of operation of the vehicle 20 in the first mode may be a fixed speed or a variable speed. Operating the vehicle 20 in the first mode allows the implement 40 to perform a primary work function, which may be based upon the implement status information 48. It is contemplated that the primary work function may require and/or may be more efficiently performed when the vehicle 20 is operated at the speed(s) of the first mode. For example, as shown in FIG. 1, the implement 40 may be a baler and the primary work function may be collecting material along a windrow. In this manner, the primary work function is performed with operation of the vehicle 20 in the first mode. Additionally, in this manner, operation of the vehicle 20 may depend on a determination made by the implement 40.

As shown in FIG. 2, during operation of the vehicle 20 in the first mode, the sensor 46 may provide a second determination of the implement status information 48 to the implement ECU 42. Upon receipt of the second determination of the implement status information 48 by the implement ECU 42 from the sensor 46, the implement ECU 42 is configured to transmit the second signal 44b to the vehicle ECU 22. In correspondence with the second signal 44b transmitted to the vehicle ECU 22 by the implement ECU 42, the vehicle ECU 22 is configured to control operation of the vehicle 20 in the second mode. In the disclosed embodiment, operation of the vehicle 20 in the second mode includes operation of the vehicle 20 at a standstill. As such, operation of the vehicle 20 in the second mode includes operating the vehicle 20 at a speed that is less than a speed of operation of the vehicle 20 in the first mode. More specifically, the second mode may include operation of the vehicle 20 at a speed within a range of speeds between 0.00 km/h and a selected upper limit speed of the second mode. In the disclosed embodiment, the selected upper limit speed of the second mode may be a speed within a range of speeds between 0.00 km/h and 0.50 km/h, but may preferably be a speed within a range of speeds between 0.00 km/h and 0.10 km/h. It is contemplated that the speed of operation of the vehicle 20 in the second mode may be a fixed speed or a variable speed. Operating the vehicle 20 in the second mode allows the implement 40 to perform secondary work functions, which may be based upon the implement status information 48. In the disclosed embodiment, the secondary work functions may be different from the work functions performed when the vehicle 20 is operated in the first mode. It is contemplated that the secondary work functions may require and/or may be more efficiently performed when the vehicle 20 is operated at the speed(s) of the second mode.

For example, as shown in FIG. 1, the implement 40 may be a baler and the secondary work functions may be wrapping a bale 90 of collected material and releasing a bale 90 of collected material. In this example, after the sensor 46 makes a second determination, that a threshold amount of material has been collected, and provides the implement status information 48 to the implement ECU 42, the second signal 44b is transmitted to operate the vehicle 20 in the second mode. The implement 40 may then wrap a bale 90 of collected material and release the bale 90 of collected material during operation of the vehicle 20 in the second mode. In this manner, the secondary work functions are performed with operation of the vehicle 20 in the second mode. Additionally, in this manner, operation of the vehicle 20 may depend on a determination made by the implement 40.

After the implement 40 has performed the secondary work functions, the sensor 46 may provide a third determination of the implement status information 48 to the implement ECU 42. Upon receipt of the third determination of the implement status information 48 by the implement ECU 42 from the sensor 46, the implement ECU 42 is configured to transmit a third signal 44c to the vehicle ECU 22. In correspondence with the third signal 44c transmitted to the vehicle ECU 22 by the implement ECU 42, the vehicle ECU 22 is configured to control operation of the vehicle 20 in the third mode. It is contemplated that the third mode may be substantially similar to and/or the same as the first mode. The third signal 44c may function as a prompt to operate the vehicle 20 in the third mode and/or resume normal operating speed of the vehicle 20, which is sent from the implement ECU 42 to the vehicle ECU 22. Additionally or alternatively, the third signal 44c may function to prompt a request 24 to operate the vehicle 20 in the third mode and/or resume normal operating speed of the vehicle 20, which is sent from the vehicle ECU 22 to the actuator 60. As such, until the request 24 is acknowledged by a user, the vehicle 20 is still operated in the second mode. In the disclosed embodiment, a speed of operation of the vehicle 20 in the third mode is greater than a speed of operation of the vehicle 20 in the second mode. Additionally or alternatively, a speed of operation of the vehicle 20 in the third mode may be equal to a speed of operation of the vehicle 20 in the first mode. More specifically, the third mode may include operation of the vehicle 20 at a speed within a range of speeds between a selected upper limit speed of the second mode of operation of the vehicle 20 and 20.00 km/h. Additionally or alternatively, the first mode may include operation of the vehicle 20 at a speed within a range of speeds between 0.11 km/h and 20.00 km/h, but may preferably include operation of the vehicle 20 at a speed of approximately 5.00 km/h. It is contemplated that the speed of operation of the vehicle 20 in the third mode may be a fixed speed or a variable speed. Operating the vehicle 20 in the third mode allows the implement 40 to resume performance of the primary work function and/or a work function different from the secondary work functions. In the example in which the implement 40 is a baler and the primary work function is collecting material along a windrow, after the sensor 46 makes a third determination, that the collected material is below the threshold amount of collected material, the third signal 44c is transmitted to operate the vehicle 20 in the third mode. The implement 20 may then resume collecting material along the windrow. In this manner, the primary work function and/or a different work function from the secondary work functions is performed with operation of the vehicle 20 in the third mode. Additionally, in this manner, operation of the vehicle 20 may depend on a determination made by the implement 40.

As shown in FIGS. 1-2 of the disclosed embodiment, the actuator 60 may be configured to function as an intermediary and/or safeguard between the vehicle 20 and the implement 40. More specifically, the actuator 60 may be configured to function as an intermediary and/or safeguard between the third signal 44c being transmitted from the implement ECU 42 to the vehicle ECU 22. Additionally or alternatively, the actuator 60 may be configured to function as an intermediary and/or safeguard between operating the vehicle 20 in the second mode and operating the vehicle 20 in the third mode. As such, the actuator 60 may be configured to allow a user to send an acknowledgment (also referred to herein as "input" and/or a "command") 62 corresponding to the third signal 44c sent from the implement ECU 42 to the vehicle ECU 22, and/or the request 24 sent by the vehicle ECU 22 to the actuator 60, to operate the vehicle 20 in the third mode and/or return the vehicle 20 to normal operating speed. Accordingly, the vehicle 20 may be held in the second mode, and may not be operated in the third mode, until a user actuates the actuator 60. To this end, the actuator 60 may be included by the vehicle ECU 22. Additionally or alternatively, the actuator 60 may be included by a separate control device of the vehicle 20 which is configured to communicate with the vehicle ECU 22. As such, in the disclosed embodiment, the actuator 60 may be included by an operation terminal (not shown) which causes software to carry out the input 62 by the user to the vehicle ECU 22. It is contemplated that the operation terminal may include a display, such as a touch panel display. The operation terminal may be capable of displaying information which corresponds to farm work. Additionally or alternatively, the operation terminal may display necessary information (e.g., respective current operational states of the vehicle 20 and the implement status information 48), while also allowing the input 62 and/or instruction by the user to each of the vehicle 20 and the implement 40. In the disclosed embodiment, the actuator 60 may be a mechanical-type button, capacitive touch sensor-type button/user interface (UI) button, voice recognition-type control, or gesture recognition-type control configured to communicate with the vehicle ECU 22 and/or the operation terminal. Additionally or alternatively, the actuator 60 may be a pedal configured to communicate with the vehicle ECU 22 and/or the operation terminal. In this manner, the actuator 60 allows for a requirement of input from the user in order for the vehicle to return from a standstill to normal operating speed. Consequently, the actuator 60 allows for the system 10 to provide for additional safety in carrying out a work function.

In the disclosed embodiment, upon transmission of the third signal 44c from the implement ECU 42 to the vehicle ECU 22, a prompt may be displayed on the operation terminal. Additionally or alternatively, upon transmission of the third signal 44c from the implement ECU 42 to the vehicle ECU 22, the user may send the acknowledgement 62 of the third signal 44c (and/or the request 24) to the vehicle ECU 22 to operate the vehicle 20 in the third mode and/or to return the vehicle 20 to normal operating speed. The user may send the acknowledgement 62 to the vehicle ECU 22 to operate the vehicle 20 in the third mode and/or to return the vehicle 20 to normal operating speed by actuating the actuator 60. In the disclosed embodiment, the user may actuate the actuator 60 by performing an appropriate action, depending on the type of actuator 60, to send the acknowledgement 62 of the request 24 to operate the vehicle 20 in the third mode and/or to return the vehicle 20 to normal operating speed. Particularly, to send the acknowledgement 62 of the request 24 to operate the vehicle 20 in the third mode and/or to return the vehicle 20 to normal operating speed, the user may push a button and/or a pedal to an extent in a range between 1% to 25% of acceleration, but preferably 5% of acceleration. Additionally or alternatively, to send the acknowledgement 62 of the request 24 to operate the vehicle 20 in the third mode and/or to return the vehicle 20 to normal operating speed, the user may push the button and/or the pedal for a time within a range of 0.025 s to 1 s, but preferably for 0.100 s. Upon receipt of the acknowledgment 62 of the request 24 and/or the third signal 44*c* by the vehicle ECU 22 from the actuator 60, the vehicle ECU 22 is configured to operate the vehicle 20 in the third mode. In this manner, the user is capable of manually returning the vehicle 20 to normal operating speed from a standstill, thereby improving oversight of the user and safety in the completion of farm work with a TIM system.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of the system may be transposed, alone or in combination, to a method and/or an apparatus and vice versa.

The invention claimed is:

1. A system for controlling operation of a vehicle, the vehicle configured to operate in combination with a work machine and the work machine configured to perform a work function, the system comprising:
   a work machine electronic control unit configured to communicate with the vehicle and to control performance of a work function of the work machine, wherein the work machine is a baler;
   a vehicle electronic control unit configured to communicate with the work machine and to control operation of the vehicle;
   wherein
   the vehicle electronic control unit is configured to control operation of the vehicle in a first mode, the first mode being determined by a first signal transmitted from the work machine electronic control unit to the vehicle electronic control unit, wherein the vehicle moves at a normal operating speed in the first mode, and operating the vehicle in the first mode allows the work machine to perform a primary work function that comprises collecting material along a windrow;
   the vehicle electronic control unit is further configured to operate the vehicle in a second mode, the second mode being determined by a second signal transmitted from the work machine electronic control unit to the vehicle electronic control unit, wherein the vehicle operates at standstill in the second mode, and operating the vehicle in the second mode allows the work machine to perform a secondary work function that comprises at least one of wrapping a bale of collected material or releasing a bale of collected material;
   the vehicle electronic control unit is further configured to operate the vehicle in a third mode, the third mode being determined by a third signal transmitted from the work machine electronic control unit to the vehicle electronic control unit, wherein the vehicle returns from operating at standstill in the second mode to a normal operating speed in the third mode, and operating the vehicle in the third mode allows the work machine to resume performance of the primary work function or a work function different from the secondary work function;
   wherein the third signal is transmitted by the work machine electronic control unit to the vehicle electronic control unit based upon a determination of an implement status information made by the work machine corresponding to completion of performance of the secondary work function by the work machine; wherein the determination of the implement status information is made by a sensor included by the work machine, and
   the system further comprises an actuator configured to send a command to the vehicle electronic control unit to operate the vehicle in the third mode, the command being sent when the pedal is pushed by a user to an extent in a range between 1% to 25% of acceleration or for a time within a range of 0.025s to 1s.

2. The system according to claim 1, wherein the first signal and second signal are sent from the work machine electronic control unit to the vehicle electronic control unit based upon further determinations made by the work machine corresponding to performance of a work function by the work machine.

3. The system according to claim 2, wherein the further determinations made by the work machine are made by a sensor included by the work machine.

4. The system according to claim 3, wherein the further determinations made by the sensor are sent to the work machine electronic control unit.

5. The system according to claim 1, wherein the second mode includes the vehicle moving at a speed within a range of speeds between 0.00 km/h and 0.50 km/h.

6. The system according to claim 1, wherein a speed of operation of the vehicle in the first mode is greater than a speed of operation of the vehicle in the second mode.

7. The system according to claim 1, wherein a speed of operation of the vehicle in the third mode is greater than a speed of operation of the vehicle in the second mode.

8. The system according to claim 1, wherein the third signal is prompted to be transmitted from the work machine electronic control unit to the vehicle electronic control unit based upon a measurement related to one or more specific feature and/or function of the vehicle.

9. The system according to claim 8, wherein the one or more specific feature and/or function of the vehicle are among: speed of the vehicle, oil pressure of the vehicle, hitch position of the vehicle, and power take-off rpm of the vehicle.

10. The system of claim 8, wherein the one or more specific feature and/or function of the vehicle is at least one of oil pressure of the vehicle or hitch position of the vehicle.

11. A method for controlling a vehicle, the vehicle configured to operate in combination with a work machine and the work machine configured to perform a work function, the method comprising:
    communicating a first signal from the work machine to the vehicle, wherein the work machine is a baler;
    operating the vehicle in a first mode, the first mode being determined by the first signal transmitted from the work machine to the vehicle, wherein the vehicle moves at a normal operating speed in the first mode, and operating the vehicle in the first mode allows the work machine to perform a primary work function that comprises collecting material along a windrow;

communicating a second signal from the work machine to the vehicle;

operating the vehicle in a second mode, the second mode being determined by the second signal transmitted from the work machine to the vehicle, wherein the vehicle operates at standstill in the second mode, and operating the vehicle in the second mode allows the work machine to perform a secondary work function that comprises at least one of wrapping a bale of collected material or releasing a bale of collected material;

communicating a third signal from the work machine to the vehicle; and executing a command to operate the vehicle in a third mode, the third mode being determined by the third signal transmitted from the work machine to the vehicle, wherein the vehicle returns from operating at standstill in the second mode to a normal operating speed in the third mode, and operating the vehicle in the third mode allows the work machine to resume performance of the primary work function or a work function different from the secondary work function;

wherein communicating the third signal is based upon a determination of an implement status information made by the work machine corresponding to completion of performance of the secondary work function by the work machine;

wherein the determination of the implement status information is made by a sensor included by the work machine; and wherein the command is sent by using a pedal actuator when the pedal actuator is pushed by a user to an extent in a range between 1% to 25% of acceleration or for a time within a range of 0.025s to 1s.

12. The method according to claim 11, wherein communicating the third signal includes prompting a request to operate the vehicle in the third mode to be sent to the vehicle.

13. The method according to claim 12, wherein operating the vehicle in the first mode includes operating the vehicle at a speed greater than a speed of operation of the vehicle in the second mode.

14. The method according to claim 12, wherein operating the vehicle in the third mode includes operating the vehicle at a speed greater than a speed of operation of the vehicle in the second mode.

15. The method of claim 12, wherein communicating the third signal from the work machine electronic control unit to the vehicle electronic control unit is prompted based upon a measurement related to one or more specific feature and/or function of the vehicle.

16. The method of claim 15, wherein the one or more specific feature and/or function of the vehicle are among: speed of the vehicle, oil pressure of the vehicle, hitch position of the vehicle, and power take-off rpm of the vehicle.

17. The method of claim 15, wherein the one or more specific feature and/or function of the vehicle is at least one of oil pressure of the vehicle or hitch position of the vehicle.

18. A system for controlling operation of a vehicle, the system comprising the vehicle, a baler, and a pedal and/or a button, the vehicle being configured to operate in combination with the baler, the baler being configured to perform a work function, the pedal and/or the button being configured to function as an intermediary and/or safeguard between communications of the vehicle and the baler, wherein the vehicle comprises a vehicle electronic control unit configured to communicate with the baler and to control operation of the vehicle;

wherein the baler comprises a baler electronic control unit configured to communicate with the vehicle and to control performance of a work function of the baler, the baler electronic control unit being further configured to transmit a first signal, a second signal, and a third signal to the vehicle electronic control unit, wherein the vehicle electronic control unit is configured to control operation of the vehicle in a first mode when the first signal is transmitted from the baler electronic control unit to the vehicle electronic control unit, in the first mode the vehicle moving at a normal operating speed which allows the baler to perform a primary work function that comprises collecting material along a windrow;

wherein the vehicle electronic control unit is further configured to operate the vehicle in a second mode when the second signal is transmitted from the baler electronic control unit to the vehicle electronic control unit, in the second mode the vehicle operating at standstill which allows the baler to perform a secondary work function that comprises at least one of wrapping a bale of collected material or releasing a bale of collected material; and wherein the vehicle electronic control unit is further configured to operate the vehicle in a third mode when the third signal is transmitted from the baler electronic control unit to the vehicle electronic control unit and when a command is sent from the actuator to the vehicle electronic control unit to operate the vehicle in the third mode, in the third mode the vehicle returning from operating at standstill in the second mode to a normal operating speed which allows the baler to resume performance of the primary work function or a work function different from the secondary work function;

wherein the baler electronic control unit transmits the third signal based upon a determination of an implement status information made by the baler, the implement status information corresponding to completion of performance of the secondary work function by the baler, the determination of the implement status information being made by a sensor included by the baler; and wherein the pedal and/or the button is configured to send the command to the vehicle electronic control unit when the pedal and/or the button is pushed by a user to an extent in a range between 1% to 25% of acceleration or for a time within a range of 0.025s to 1s.

19. A method for controlling a vehicle, the vehicle being configured to operate in combination with a baler configured to perform a work function, the method comprising:

transmitting a first signal from the baler to the vehicle;

operating the vehicle in a first mode upon the transmission of the first signal from the baler to the vehicle, in the first mode the vehicle moving at a normal operating speed which allows the baler to perform a primary work function that comprises collecting material along a windrow;

transmitting a second signal from the baler to the vehicle;

operating the vehicle in a second mode upon the transmission of the second signal from the baler to the vehicle, in the second mode the vehicle operating at standstill which allows the baler to perform a secondary work function that comprises at least one of wrapping a bale of collected material or releasing a bale of collected material; and transmitting a third signal from the baler to the vehicle based upon a determination of an implement status information made by the baler corresponding to completion of performance of the secondary work function by the baler, the determination of the implement status information being made by a sensor included by the baler; and executing a command to operate the vehicle in a third mode upon the transmission of the third signal from the baler to the vehicle, in the third mode the vehicle returns from operating at standstill in the second mode to a normal operating speed which allows the baler to resume performance of the primary work function or a work function different from the secondary work function;

wherein the command is executed when a pedal and/or a button is pushed by a user to an extent in a range between 1% to 25% of acceleration or for a time within a range of 0.025s to 1s, the pedal and/or the button functioning as an intermediary and/or safeguard between communications of the vehicle and the baler.

\* \* \* \* \*